US010705288B2

(12) United States Patent
Dunn et al.

(10) Patent No.: US 10,705,288 B2
(45) Date of Patent: Jul. 7, 2020

(54) THERMAL MANAGEMENT SYSTEM FOR A TRANSPARENT ELECTRONIC DISPLAY LOCATED IN AN ACCESS PANEL OF A DISPLAY CASE

(71) Applicant: Manufacturing Resources International, Inc., Alpharetta, GA (US)

(72) Inventors: William Dunn, Alpharetta, GA (US); Marcos Diaz, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 129 days.

(21) Appl. No.: 15/665,618

(22) Filed: Aug. 1, 2017

(65) Prior Publication Data

US 2017/0329078 A1    Nov. 16, 2017

Related U.S. Application Data

(63) Continuation of application No. 15/357,917, filed on Nov. 21, 2016, now Pat. No. 9,733,420, which is a
(Continued)

(51) Int. Cl.
*F21V 8/00* (2006.01)
*G02F 1/1333* (2006.01)
(Continued)

(52) U.S. Cl.
CPC ............ *G02B 6/0085* (2013.01); *A47B 81/06* (2013.01); *A47F 3/043* (2013.01); *A47F 3/0434* (2013.01);
(Continued)

(58) Field of Classification Search
CPC combination set(s) only.
See application file for complete search history.

(56) References Cited

U.S. PATENT DOCUMENTS 3,629,972 A    12/1971    Rehberg et al.
4,040,726 A    8/1977    Paca
(Continued)

FOREIGN PATENT DOCUMENTS

CA    2815355 A1    5/2012
CN    101949526 A    1/2011
(Continued)

OTHER PUBLICATIONS

A. Vogler & H. Kunkley, Photochemistry and Beer, Jan. 1982, 3 Pages, vol. 59, No. 1.
(Continued)

*Primary Examiner* — Lauren Nguyen
(74) *Attorney, Agent, or Firm* — Standley Law Group LLP; Jeffrey S. Standley; Adam J. Smith

(57) ABSTRACT

An apparatus for viewing an image and a plurality of products simultaneously includes a display case to holds the products. An access panel assembly is placed over an opening in the case to allow access to the products. The assembly includes a transparent electronic display for displaying the image which is located in front of a light guide. A number of illumination devices are placed adjacent to an edge of the light guide to help illuminate the display. A thermal plate is located in close proximity to the illumination devices to conduct heat produced therefrom.

18 Claims, 6 Drawing Sheets

Related U.S. Application Data continuation of application No. 14/740,865, filed on Jun. 16, 2015, now Pat. No. 9,500,896.

(60) Provisional application No. 62/012,785, filed on Jun. 16, 2014.

(51) Int. Cl.

| A47F 11/10 | (2006.01) |
|---|---|
| A47B 81/06 | (2006.01) |
| A47F 3/04 | (2006.01) |
| G09F 9/35 | (2006.01) |
| G09F 23/06 | (2006.01) |
| G02F 1/13357 | (2006.01) |
| G09F 9/33 | (2006.01) |
| G09F 23/00 | (2006.01) |

(52) U.S. Cl.
CPC ............ *A47F 11/10* (2013.01); *G02B 6/0063* (2013.01); *G02B 6/0068* (2013.01); *G02F 1/133308* (2013.01); *G02F 1/133385* (2013.01); *G02F 1/133615* (2013.01); *G09F 9/33* (2013.01); *G09F 9/35* (2013.01); *G09F 23/06* (2013.01); *G02B 6/0088* (2013.01); *G02B 6/0095* (2013.01); *G02F 2001/133628* (2013.01); *G02F 2203/01* (2013.01); *G09F 2023/0025* (2013.01)

(56) References Cited

U.S. PATENT DOCUMENTS

| 4,299,092 | A | 11/1981 | Ibrahim |
|---|---|---|---|
| 4,371,870 | A | 2/1983 | Biferno |
| 4,853,678 | A | 8/1989 | Bishop, Jr. et al. |
| 4,950,344 | A | 8/1990 | Glover et al. |
| 7,413,233 | B1 | 8/2008 | Jung |
| 7,513,637 | B2 | 4/2009 | Kelly et al. |
| 7,922,381 | B2 | 4/2011 | Han et al. |
| 8,254,121 | B2 | 8/2012 | Lee et al. |
| 8,417,376 | B1 | 4/2013 | Smolen |
| 8,578,081 | B1 | 11/2013 | Fils |
| 8,683,745 | B2 | 4/2014 | Artwohl et al. |
| 8,982,013 | B2 | 3/2015 | Sako et al. |
| 8,988,635 | B2 | 3/2015 | Dunn et al. |
| 9,052,536 | B2 | 6/2015 | Artwohl et al. |
| 9,155,405 | B2 | 10/2015 | Artwohl et al. |
| 9,500,801 | B2 | 11/2016 | Dunn |
| 9,500,896 | B2 | 11/2016 | Dunn et al. |
| 9,514,661 | B2 | 12/2016 | Riegel |
| 9,519,185 | B2 | 12/2016 | Dunn et al. |
| 9,526,352 | B2 | 12/2016 | Dunn et al. |
| 9,535,293 | B2 | 1/2017 | Dunn |
| 9,633,366 | B2 | 4/2017 | Dunn |
| 9,661,939 | B2 | 5/2017 | Dunn et al. |
| 9,684,124 | B2 | 6/2017 | Dunn |
| 9,733,420 | B2 | 8/2017 | Dunn et al. |
| 2002/0064037 | A1 | 5/2002 | Lee |
| 2002/0075552 | A1 | 6/2002 | Poll et al. |
| 2002/0187575 | A1 | 12/2002 | Maruyama et al. |
| 2003/0062813 | A1 | 4/2003 | Cording |
| 2003/0117790 | A1 | 6/2003 | Lee et al. |
| 2003/0139169 | A1* | 7/2003 | Arreazola, Jr. ........ H04B 1/086 455/344 |
| 2004/0160388 | A1 | 8/2004 | O'Keeffe |
| 2005/0265019 | A1 | 12/2005 | Sommers et al. |
| 2006/0215958 | A1 | 9/2006 | Yeo et al. |
| 2006/0284788 | A1 | 12/2006 | Robinson et al. |
| 2007/0151274 | A1 | 7/2007 | Roche et al. |
| 2007/0171647 | A1 | 7/2007 | Artwohl et al. |
| 2007/0195535 | A1 | 8/2007 | Artwohl et al. |
| 2007/0214812 | A1 | 9/2007 | Wagner et al. |
| 2008/0024047 | A1 | 1/2008 | Juo et al. |
| 2008/0055534 | A1 | 3/2008 | Kawano |
| 2008/0094854 | A1 | 4/2008 | Coleman et al. |
| 2008/0284942 | A1 | 11/2008 | Mahama et al. |
| 2008/0295033 | A1 | 11/2008 | Lee et al. |
| 2009/0002990 | A1 | 1/2009 | Becker et al. |
| 2009/0015400 | A1 | 1/2009 | Breed |
| 2009/0097227 | A1 | 4/2009 | Kim et al. |
| 2009/0121970 | A1 | 5/2009 | Ozbek |
| 2009/0278766 | A1 | 11/2009 | Sako et al. |
| 2009/0300953 | A1 | 12/2009 | Frisch et al. |
| 2010/0026912 | A1 | 2/2010 | Ho |
| 2010/0162747 | A1 | 7/2010 | Hamel et al. |
| 2010/0238394 | A1 | 9/2010 | Dunn |
| 2010/0293827 | A1 | 11/2010 | Suss et al. |
| 2010/0309687 | A1 | 12/2010 | Sampsell et al. |
| 2011/0083460 | A1 | 4/2011 | Thomas et al. |
| 2011/0116000 | A1 | 5/2011 | Dunn et al. |
| 2011/0116231 | A1 | 5/2011 | Dunn et al. |
| 2012/0020560 | A1 | 1/2012 | Zarubinsky |
| 2012/0105424 | A1 | 5/2012 | Lee et al. |
| 2012/0105428 | A1 | 5/2012 | Fleck et al. |
| 2012/0206500 | A1 | 8/2012 | Koprowski et al. |
| 2012/0206941 | A1 | 8/2012 | He |
| 2012/0275477 | A1 | 11/2012 | Kim |
| 2012/0285089 | A1* | 11/2012 | Artwohl ................ A47F 3/0434 49/70 |
| 2012/0287368 | A1 | 11/2012 | Que et al. |
| 2013/0016296 | A1 | 1/2013 | Fujita et al. |
| 2013/0063326 | A1 | 3/2013 | Riegel |
| 2013/0120815 | A1 | 5/2013 | Aspnes et al. |
| 2013/0151006 | A1 | 6/2013 | Garson et al. |
| 2013/0158703 | A1 | 6/2013 | Lin et al. |
| 2013/0208447 | A1 | 8/2013 | Maslen |
| 2013/0211583 | A1 | 8/2013 | Borra |
| 2013/0265525 | A1 | 10/2013 | Dunn et al. |
| 2013/0271696 | A1 | 10/2013 | Dunn |
| 2014/0062316 | A1 | 3/2014 | Tischler et al. |
| 2014/0078407 | A1 | 3/2014 | Green et al. |
| 2014/0085564 | A1 | 3/2014 | Hendren et al. |
| 2014/0104538 | A1* | 4/2014 | Park ................ G02F 1/133608 349/60 |
| 2014/0137065 | A1 | 5/2014 | Feng et al. |
| 2014/0144083 | A1 | 5/2014 | Artwohl et al. |
| 2014/0204452 | A1 | 7/2014 | Branson |
| 2014/0285732 | A1 | 9/2014 | Tanabe et al. |
| 2014/0333541 | A1 | 11/2014 | Lee et al. |
| 2015/0035432 | A1 | 2/2015 | Kendall et al. |
| 2015/0177480 | A1 | 6/2015 | Bullock et al. |
| 2015/0250021 | A1 | 9/2015 | Stice et al. |
| 2015/0253612 | A1 | 9/2015 | Hasegawa et al. |
| 2015/0300628 | A1 | 10/2015 | Dunn et al. |
| 2015/0309263 | A2 | 10/2015 | Abovitz et al. |
| 2015/0338715 | A1 | 11/2015 | Schaefer et al. |
| 2015/0362667 | A1 | 12/2015 | Dunn |
| 2015/0362768 | A1 | 12/2015 | Dunn |
| 2015/0362792 | A1 | 12/2015 | Dunn et al. |
| 2015/0363819 | A1 | 12/2015 | Dunn |
| 2015/0366083 | A1 | 12/2015 | Dunn et al. |
| 2016/0037657 | A1 | 2/2016 | Yoshizumi |
| 2016/0061514 | A1 | 3/2016 | Seo et al. |
| 2016/0091755 | A1 | 3/2016 | Dunn |
| 2016/0095450 | A1 | 4/2016 | Trulaske, Sr. |
| 2016/0103275 | A1 | 4/2016 | Diaz et al. |
| 2016/0106231 | A1 | 4/2016 | Dunn et al. |
| 2016/0192451 | A1 | 6/2016 | Dunn et al. |
| 2017/0046991 | A1 | 2/2017 | Riegel |
| 2017/0068042 | A1 | 3/2017 | Dunn et al. |
| 2017/0068044 | A1 | 3/2017 | Dunn |
| 2017/0099960 | A1 | 4/2017 | Dunn et al. |
| 2017/0108735 | A1 | 4/2017 | Dunn |
| 2017/0228770 | A1 | 8/2017 | Dunn |
| 2017/0256115 | A1 | 9/2017 | Diaz |

FOREIGN PATENT DOCUMENTS

| CN | 202815379 U | 3/2013 |
|---|---|---|
| EP | 3155607 A1 | 4/2017 |
| JP | 2008180502 A | 8/2008 |
| JP | 2010171010 A | 8/2010 |
| JP | 5173088 B1 | 3/2013 |

(56) References Cited

FOREIGN PATENT DOCUMENTS

| KR | 1020040045939 A | 6/2004 |
|---|---|---|
| KR | 20120044874 | 5/2012 |
| WO | WO2006055873 A2 | 5/2006 |
| WO | WO2010116202 A1 | 10/2010 |
| WO | WO2013056109 A1 | 4/2013 |
| WO | 2014006490 A1 | 1/2014 |
| WO | WO2015195681 A1 | 12/2015 |
| WO | WO2017151934 A1 | 9/2017 |

OTHER PUBLICATIONS

Dave Ross, How Transmissive Film Works, 2008, 9 Pages.
Pilkington TEC Glass, For the Refrigeration Market, 2002, 2 Pages.

* cited by examiner

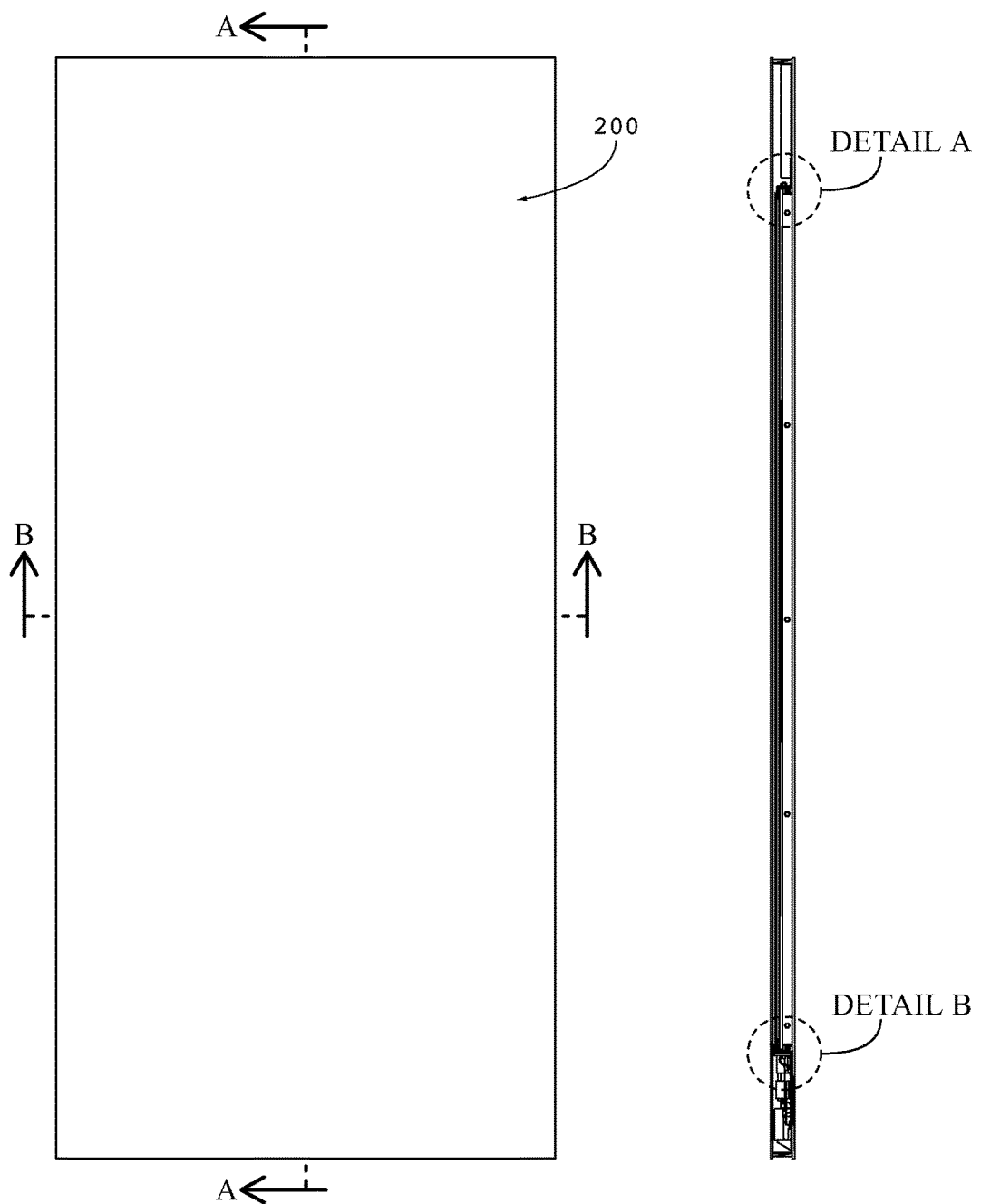
Fig. 4
Fig. 5
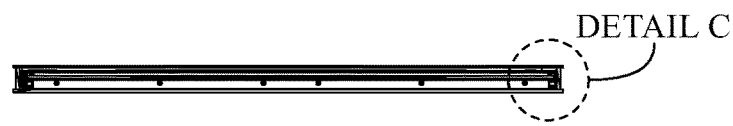
Fig. 6

THERMAL MANAGEMENT SYSTEM FOR A TRANSPARENT ELECTRONIC DISPLAY LOCATED IN AN ACCESS PANEL OF A DISPLAY CASE

CROSS-REFERENCE TO RELATED APPLICATIONS

This application is a continuation of U.S. Non-Provisional patent application Ser. No. 15/357,917 filed Nov. 21, 2016, which is a continuation of U.S. Non-Provisional patent application Ser. No. 14/740,865 filed on Jun. 16, 2015, which claims priority to U.S. Provisional Patent Application No. 62/012,785 filed on Jun. 16, 2014, all of which are hereby incorporated by reference in their entirety.

TECHNICAL FIELD

Embodiments generally relate to cooling systems for transparent liquid crystal displays (LCD) and traditional LCDs.

BACKGROUND OF THE ART

Display cases are used in a number of different retail establishments for illustrating the products that are available for sale. In some instances these display cases may be coolers or freezers which are placed in grocery stores, convenience stores, gas stations, restaurants, or other retail establishments. In other instances these display cases may be non-refrigerated transparent containers used in a jewelry or watch store, bakery, deli, antique shop, sporting goods store, electronics store, or other retail establishments. While the design and appearance of the product itself does provide some point-of-sale (POS) advertising, it has been found that additional advertising at the POS can increase the awareness of a product and in turn create additional sales.

Most retail establishments already contain some POS advertising, and depending on the type of establishment the proprietor may want to limit the amount of 'clutter' in the retail area—resulting in a very limited space for additional POS advertising. It has now become desirable to utilize the transparent glass that is typically placed in display cases with additional POS advertising. Most notably, it has been considered that transparent LCDs may be positioned along with the transparent glass and could display additional advertising materials while still allowing a patron to view the products inside the display case.

SUMMARY OF THE EXEMPLARY EMBODIMENTS

An exemplary embodiment provides a cooling system for a transparent LCD assembly. LEDs are preferably arranged along the top and bottom edges of a two way light guide which permits the light to exit both the front and rear surface of the light guide. The top LEDs are preferably placed in thermal communication with a top thermal plate which is placed in conductive thermal communication with the rear glass. Similarly, the bottom LEDs are preferably placed in thermal communication with a bottom thermal plate which is also placed in conductive thermal communication with the rear glass. The top and bottom thermal plates permit the heat to spread out and transfer to the rear glass where it can be removed by forced or natural convection.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIG. 4 is a front planar view of the sealed transparent LCD assembly, showing the section lines A-A and B-B.

FIG. 5 is a section view taken along the section line A-A shown in FIG. 4 and indicating Detail A and Detail B.

FIG. 6 is a section view taken along the section line B-B shown in FIG. 4 and indicating Detail C.

DETAILED DESCRIPTION

Figure 1:
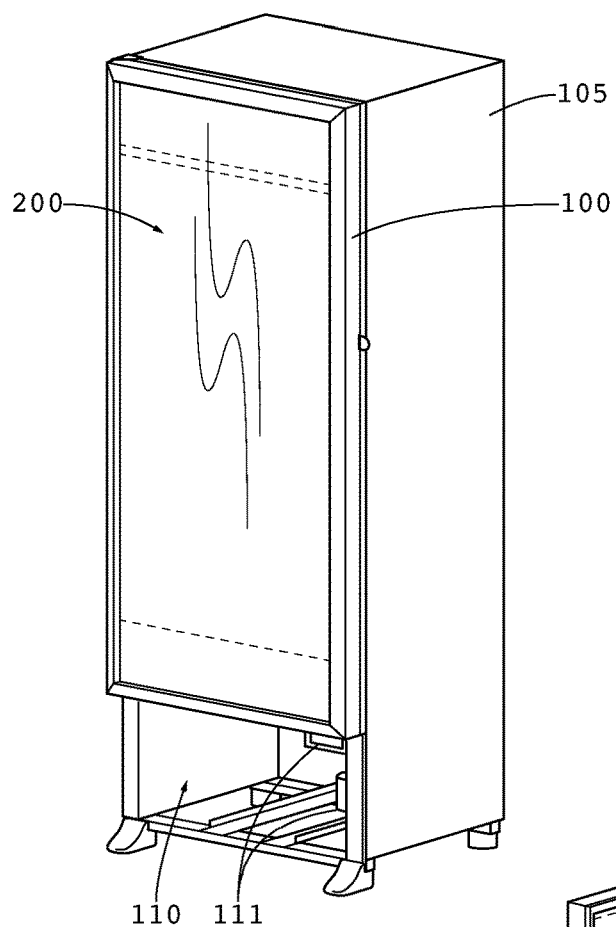
FIG. 1 is a perspective view of a display case having an exemplary sealed transparent LCD assembly.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a display case having an exemplary sealed transparent LCD assembly 200. Generally, the display case includes a housing 105, to which a door frame assembly 100 is fastened. In this embodiment, a cavity 110 is provided below the door frame assembly 100 where various electronic devices 111 for operating the transparent LCD assembly 200 can be located. The electrical devices 111 may include any or all of the following: timing and control board (TCON), video player, hard drive/storage, microprocessor/CPU, wireless transmitter/receiver, cellular data transmitter/receiver, and internet connectivity. At least some of the electrical devices 111 are in electrical communication with the transparent LCD 230.

Figure 2:
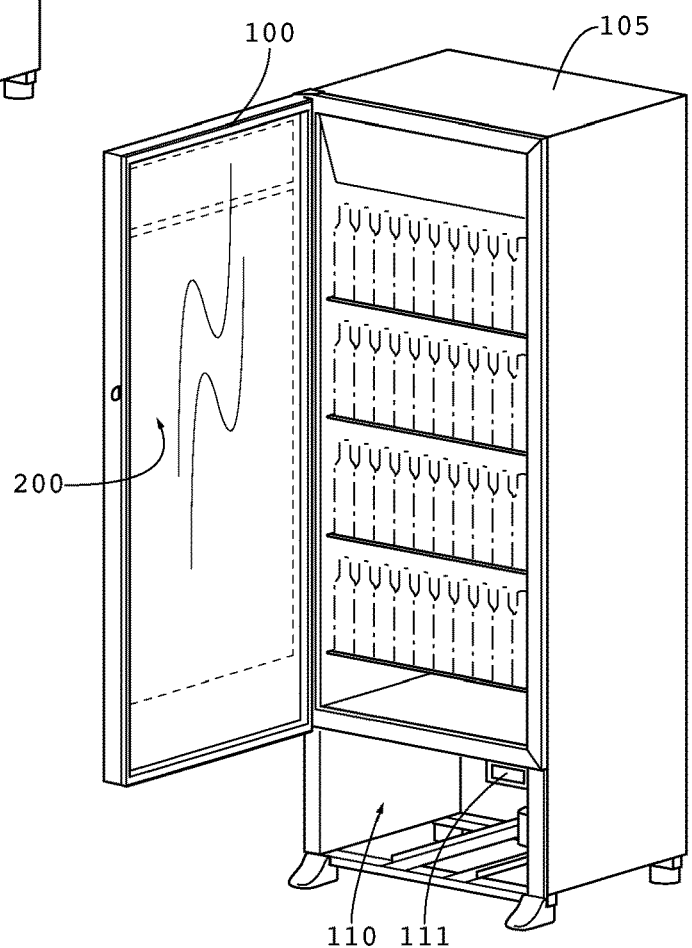
FIG. 2 is a perspective view of the display case of FIG. 1 where the door has been opened.

FIG. 2 is a perspective view of the display case of FIG. 1 where the door has been opened.

Figure 3:
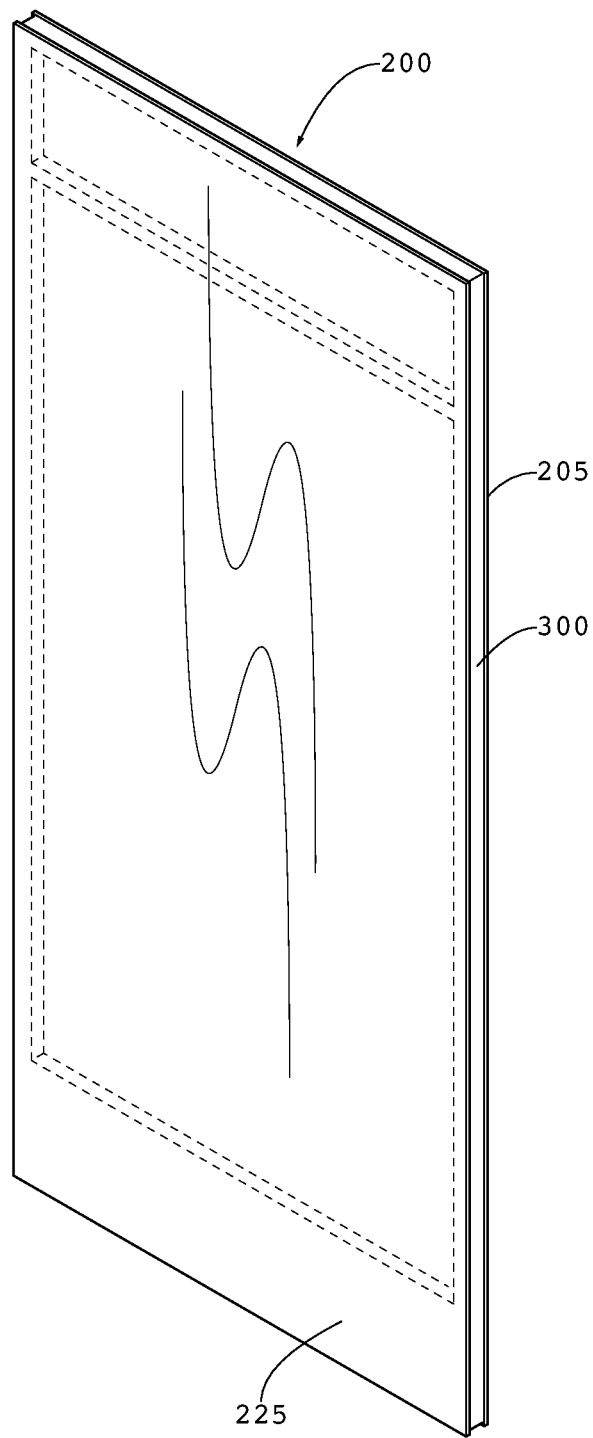
FIG. 3 is a perspective view of the sealed transparent LCD assembly of FIGS. 1-2.

FIG. 3 is a perspective view of the sealed transparent LCD assembly 200 of FIGS. 1-2. Generally speaking, the assembly includes a spacer 300 which is sandwiched between a front glass 225 and rear glass 205. These components are preferably sealed together with an inert gas filling the sealed enclosure. Although not required for every embodiment, argon gas has been found to be preferred in the exemplary embodiments. For sealing these components together, it is preferable to use a hot melt polyurethane. Preferably, the spacer 300 is the Super Spacer® Standard from Quanex in Cambridge, Ohio. www.quanex.com. In an exemplary embodiment, the spacer 300 would be a flexible foam that contains a desiccant and has a pressure sensitive acrylic adhesive on the front and back edges of the spacer which would be used to bond with the front and rear glass.

FIG. 4 is a front planar view of the sealed transparent LCD assembly, showing the section lines A-A and B-B. FIG. 5 is a section view taken along the section line A-A shown in FIG. 4 and indicating Detail A and Detail B. FIG. 6 is a section view taken along the section line B-B shown in FIG. 4 and indicating Detail C.

Figure 7:
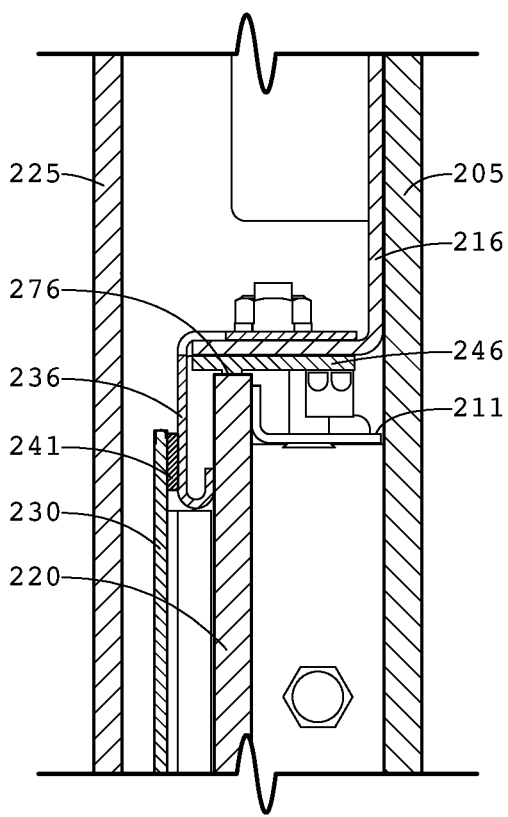
FIG. 7 is a detailed section view of Detail A shown in FIG. 5.

FIG. 7 is a detailed section view of Detail A shown in FIG. 5. A top thermal plate 216 is preferably bonded to the rear glass 205. In an exemplary embodiment, the top thermal plate 216 is preferably bonded to the rear glass 205 through adhesive transfer tape. An exemplary adhesive transfer tape for this purpose would be 468 MP, available commercially from 3M™ of St. Paul, Minn. www.3M.com/converter. A printed circuit board (PCB) 246 containing a plurality of LEDs 276 is preferably attached to the top thermal plate 216 and is preferably in conductive thermal communication with the top thermal plate 216 as well. In this way, heat that is generated by the LEDs 276 can be transmitted to the PCB 246, top thermal plate 216, and eventually transferring to the rear glass 205 where the heat can dissipate through natural or forced convection.

The LEDs 276 are placed adjacent to the edge of a light guide 220 which is sandwiched between a rear bracket 211 and a front bracket 236. Generally speaking, the light guide 220 is only constrained from movement towards the front or back of the assembly, but is not constrained from movement towards the top or sides of the assembly. In other words, the light guide 220 is secured such that it is capable of thermal expansion/contraction in the X-Y direction (horizontal and vertical when observing the LCD), but is fixed in the Z direction (into/out of the assembly when observing the LCD). It could also be said that the light guide 220 is constrained so that it cannot move towards the front or rear glass but otherwise is permitted to float between the rear bracket 211 and front bracket 236. In an exemplary embodiment, the light guide 220 would be the Acrylite® LED Endlighten product available from Evonik Industries. www.acrylite-shop.com.

Preferably, the light guide 220 would contain microscopic diffuse particulate that is homogeneously scattered throughout the sheet. Also preferably, the light emitted from the LEDs 276 and 275 is permitted to exit both the front and rear surfaces of the light guide 220 (in this way, the light guide 220 could be referred to as a 'two way light guide'). In an exemplary embodiment, the light is permitted to exit the rear of the light guide 220 so as to illuminate the products within the display case. Thus, it is preferable that the amount of light permitted to exit the rear surface of the light guide 220 is at least 20% of the amount of light permitted to exit the front surface of the light guide 220.

The transparent LCD 230 is preferably attached to a front surface of the front bracket 236 through a layer of adhesive 241 which would preferably be applied around the perimeter of the LCD 230. In an exemplary embodiment, the adhesive 241 would be VHB tape and preferably 5052 VHB Tape available commercially from 3M™ of St. Paul, Minn. www.3M.com.

Figure 8:
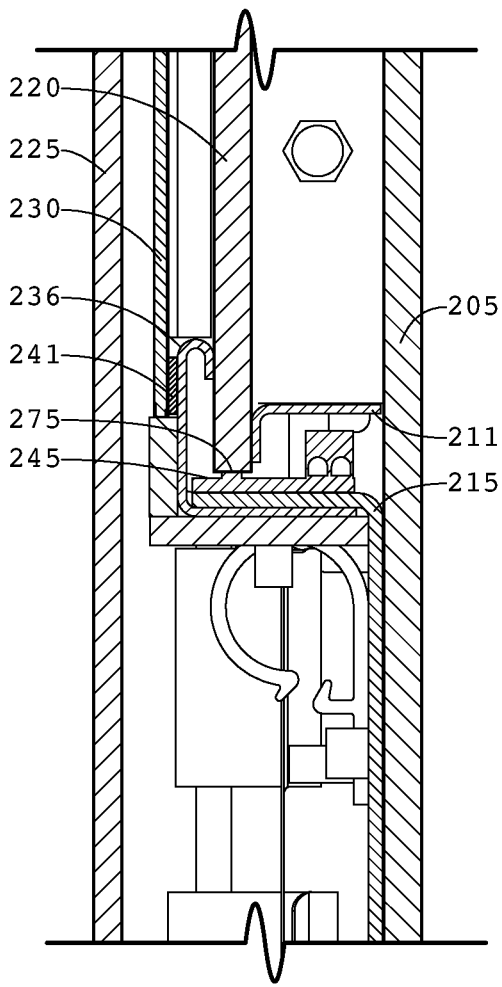
FIG. 8 is a detailed section view of Detail B shown in FIG. 5.

FIG. 8 is a detailed section view of Detail B shown in FIG. 5. A bottom thermal plate 215 is preferably bonded to the rear glass 205. In an exemplary embodiment, the bottom thermal plate 215 is preferably bonded to the rear glass 205 through adhesive transfer tape. An exemplary adhesive transfer tape for this purpose would be 468 MP, available commercially from 3M™ of St. Paul, Minn. www.3M.com/converter. A printed circuit board (PCB) 245 containing a plurality of LEDs 275 is preferably attached to the bottom thermal plate 215 and is preferably in conductive thermal communication with the bottom thermal plate 215 as well. In this way, heat that is generated by the LEDs 275 can be transmitted to the PCB 245, bottom thermal plate 215, and eventually transferring to the rear glass 205 where the heat can dissipate through natural or forced convection.

The LEDs 275 are placed adjacent to the edge of a light guide 220 which is sandwiched between a rear bracket 211 and a front bracket 236. As discussed at length above, the light guide 220 is preferably only constrained from movement towards the front or back of the assembly, but is not contained from movement towards the top or sides of the assembly.

Figure 9:
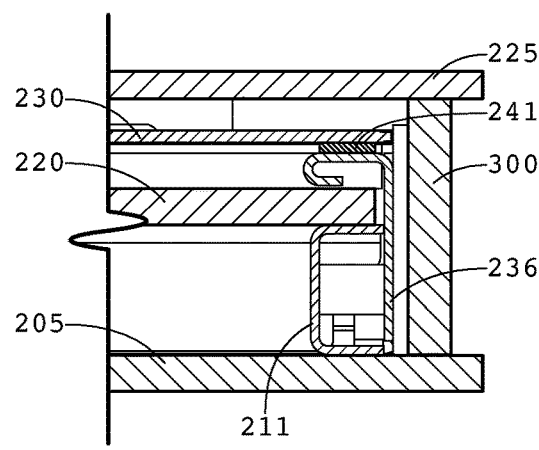
FIG. 9 is a detailed section view of Detail C shown in FIG. 6.

FIG. 9 is a detailed section view of Detail C shown in FIG. 6.

Figure 10:
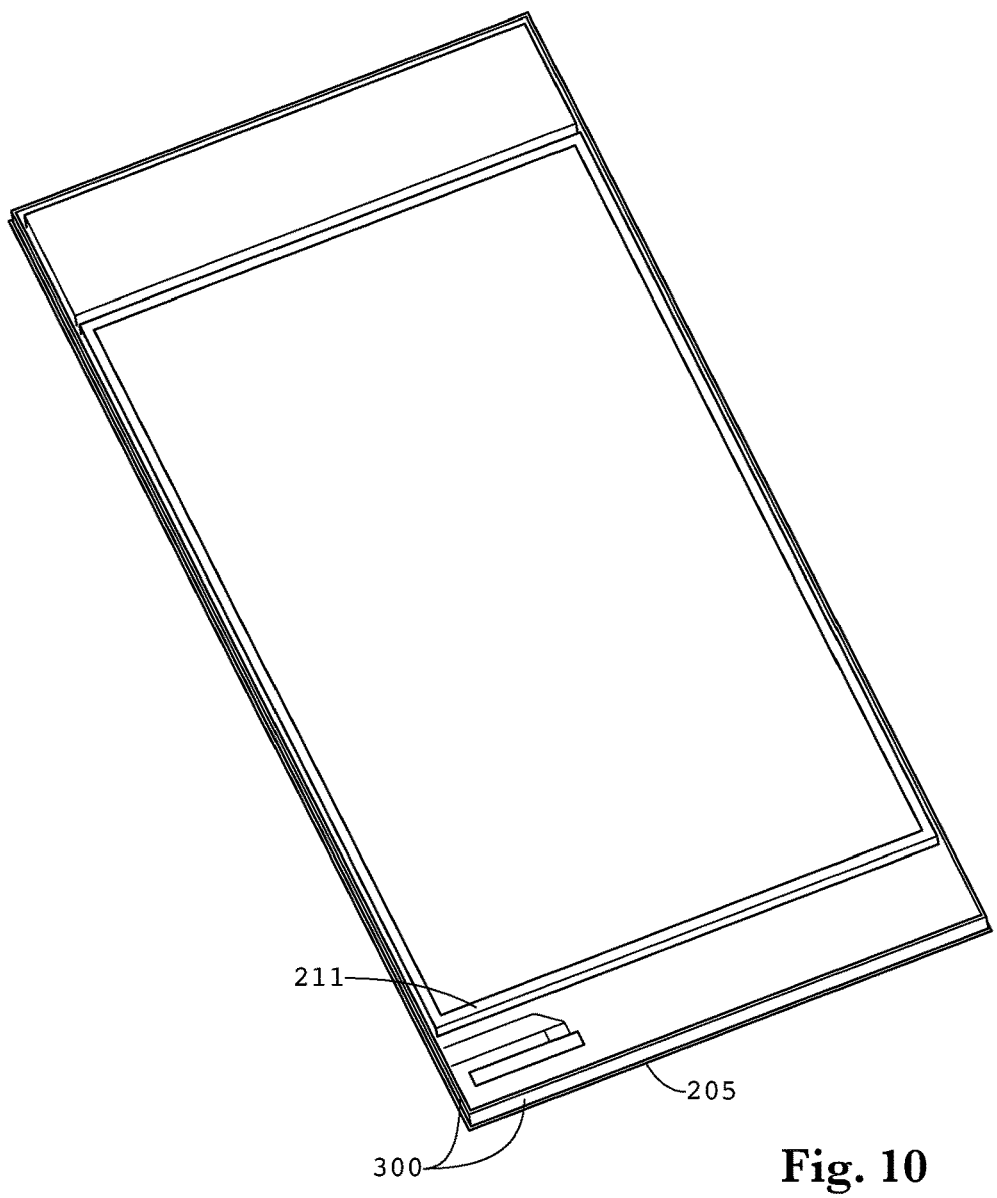
FIG. 10 is a perspective view of a partially assembled exemplary embodiment of a sealed transparent LCD assembly.

FIG. 10 is a perspective view of a partially assembled exemplary embodiment of a sealed transparent LCD assembly. This view shows the rear glass 205 with the spacer 300 attached around the perimeter of the glass 205. Also shown is the rear bracket 211 which may be attached to the rear glass 205 as well.

Figure 11:
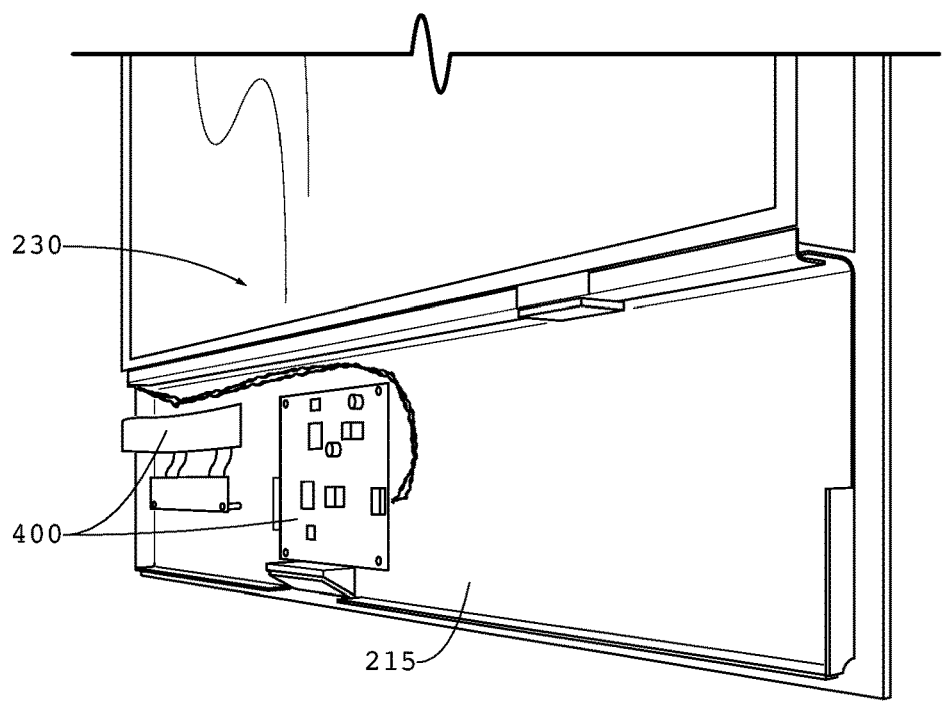
FIG. 11 is a simplified partial view of an exemplary embodiment of the lower thermal plate.

FIG. 11 is a simplified partial view of an exemplary embodiment of the lower thermal plate 215. In a preferred embodiment, the lower thermal plate 215 would extend horizontally as far as possible, preferably to the same horizontal width as the LCD 230 and may extend 4-14 inches in vertical width, depending on the application. In this embodiment, electrical devices 400 are mounted to the thermal plate 215 and can include, but are not limited to: power modules, wireless or satellite receiver/transmitter, video player, hard drive, microprocessor, and printed circuit boards. Although shown attached to the lower thermal plate 215, electrical devices 400 could also be mounted to the upper thermal plate 216. Preferably, the electrical devices 400 are also in conductive thermal communication with the thermal plate 215/216 so that heat which is generated by the electrical devices 400 can be transferred to the thermal plate 215/216 and eventually to the rear glass 205, where it can be removed by natural or forced convection.

Figure 12:
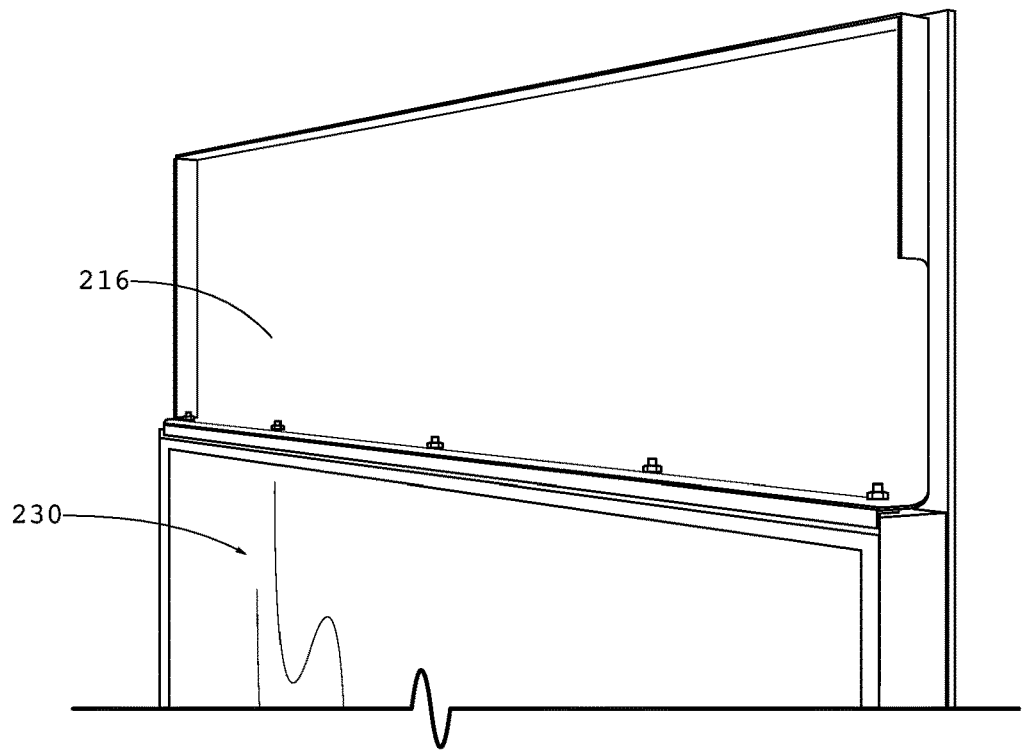
FIG. 12 is a simplified partial view of an exemplary embodiment of the upper thermal plate.

FIG. 12 is a simplified partial view of an exemplary embodiment of the upper thermal plate. Again, in a preferred embodiment, the upper thermal plate 216 would extend horizontally as far as possible, preferably to the same horizontal width as the LCD 230. The upper thermal plate 216 may also extend 4-14 inches in vertical width, depending on the application. While not required, it is also preferred that the lower thermal plate 215 and the upper thermal plate 216 are within 15% of the same surface area. In other words, it is preferred that the plates 215/216 are substantially the same surface area. This is not required, however, as some embodiments may require a larger surface area for the plate which would contain the electrical devices 400, or a larger surface area for the top plate 216 as compared to the bottom plate 215. It is preferred that the thermal plates are both metallic, and most preferably aluminum, but they can be any material that has good thermal conductivity.

The embodiments of the cooling system described herein can be used with any number of display case designs, either temperature controlled or not, and with doors that open, or glass that remains stationary. Although shown here with a transparent LCD, the cooling system could be used with a traditional backlit LCD as well.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. An apparatus for thermally managing a display case comprising:
   a housing adapted to hold a plurality of products, wherein said housing defines an opening; and
   an access panel assembly mounted to the housing and configured to move between an opened position, whereby the products may be accessed, and a closed position, whereby the access panel covers the opening, wherein said access panel assembly comprises:
      a transparent electronic display having a perimeter and configured to display an image and permit the products to be simultaneously viewed therethrough;
      a light guide positioned behind the transparent electronic display;
      a number of illumination devices positioned adjacent to one or more edges of the light guide such that light emitted from the illumination devices is configured to travel through said light guide and illuminate the transparent electronic display; and
      a thermal plate positioned adjacent to and in thermal communication with the illumination devices, wherein said thermal plate is configured to absorb heat produced by the illumination devices, wherein said thermal plate extends beyond the perimeter of said transparent electronic display and is configured to release said absorbed heat to the ambient environment, and wherein the entirety of said thermal plate is located beyond the perimeter of said transparent electronic display such that no portion of the image displayed on said transparent electronic display is obscured.

2. The apparatus of claim 1 wherein:
the illumination devices are light emitting diodes (LEDs).

3. The apparatus of claim 1 wherein:
the illumination devices are located along an upper edge and a lower edge of the light guide;
the thermal plate comprises a first portion positioned above the illumination devices and along the upper edge of the light guide; and
the thermal plate comprises a second portion positioned below the illumination devices and along a lower edge of the light guide.

4. The apparatus of claim 3 wherein:
the first and second portions of the thermal plate have substantially the same surface area.

5. The apparatus of claim 4 wherein:
the first portion and the second portion of the thermal plate have substantially the same horizontal width as the transparent electronic display.

6. The apparatus of claim 1 wherein:
the light guide is configured to permit the light from the illumination devices that passes through the light guide to also illuminate said products.

7. The apparatus of claim 1 wherein:
the display case is refrigerated; and
the products are bottled or otherwise packaged beverages.

8. The apparatus of claim 1, wherein:
the access panel assembly is a door.

9. The apparatus of claim 1, further comprising:
a plurality of electronic devices mounted to the thermal plate.

10. The apparatus of claim 9, wherein:
the plurality of electronic devices comprises:
   a wireless transmitter/receiver;
   a video player; and
   an electronic storage device.

11. The apparatus of claim 1, further comprising:
a cover glass; and
a transparent layer, wherein the transparent electronic display is located between the cover glass and the transparent layer.

12. An apparatus for thermally managing a display case comprising:
   a housing adapted to hold a plurality of products within a refrigerated cavity; and
   an access panel assembly located on said housing and configured to permit access to said products, wherein said access panel assembly comprises:
      a first transparent layer;
      a second transparent layer positioned adjacent to said refrigerated cavity;
      a transparent electronic display located between said first and second transparent layer and having a perimeter;
      a light guide positioned between said transparent electronic display and said second transparent layer;

a number of lights positioned adjacent to at least one edge of said perimeter of said light guide such that the light from said number of lights is configured to pass through the light guide and illuminate the transparent electronic display and the plurality of products in a way which permits the image and the plurality of products to be viewed simultaneously; and a heat sink attached to said second transparent layer and extending adjacent to the number of lights, wherein said heat sink is in conductive thermal communication with the number of lights and is configured to absorb heat generated by said number of lights, wherein the entirety of said heat sink is located beyond the perimeter of said transparent electronic display such that no portion of the transparent electronic display is obscured by said heat sink.

13. The apparatus of claim 12 wherein:
the heat sink is a plate comprised of a metallic material; and
the heat sink comprises a top portion located above said transparent electronic display and a bottom portion located below said transparent electronic display, wherein the top and bottom portions are substantially the same horizontal width as the transparent electronic display.

14. The apparatus of claim 12 wherein:
the lights are LEDs.

15. The apparatus of claim 12 wherein:
the image is an advertising image.

16. The apparatus of claim 12 wherein:
the products are retail goods.

17. An apparatus for thermally managing a display case comprising:
a cooler adapted to hold packaged products;
a door mounted to a front portion of said cooler and configured to permit access to said products;
a transparent electronic display having a perimeter and secured within said door, wherein said transparent electronic display is adapted to display at least one advertising image in a way which permits said products to be simultaneously viewed inside said cooler, through said display, and through said at least one image;
a light source electrically connected to a power source, said light source attached to at least one of said door and said display, and in physical association with said display, to illuminate said image; and
a heat transfer plate in thermal communication with the light source, wherein said heat transfer element is configured to absorb heat generated by said light source and transmit said heat to the cooler or an ambient environment, and wherein the entirety of said heat transfer plate is located beyond the perimeter of said transparent electronic display such that no portion of the image is obscured from view.

18. The display case assembly of claim 17, wherein:
the light source also aids in the illumination of said products.

* * * * *

UNITED STATES PATENT AND TRADEMARK OFFICE
CERTIFICATE OF CORRECTION

PATENT NO.        : 10,705,288 B2                                     Page 1 of 1
APPLICATION NO.   : 15/665618
DATED             : July 7, 2020
INVENTOR(S)       : William Dunn et al.

It is certified that error appears in the above-identified patent and that said Letters Patent is hereby corrected as shown below:

In the Claims
    Column 6, Claim 12, Line 64-65, delete "and having a perimerter".
    Column 6, Claim 12, Line 67, add -- and having a perimeter; --.

Signed and Sealed this
Eleventh Day of August, 2020

Andrei Iancu
*Director of the United States Patent and Trademark Office*